Sept. 20, 1938.  J. B. DE STEFANO  2,130,918
HELICOPTER
Filed Oct. 9, 1937  4 Sheets-Sheet 1
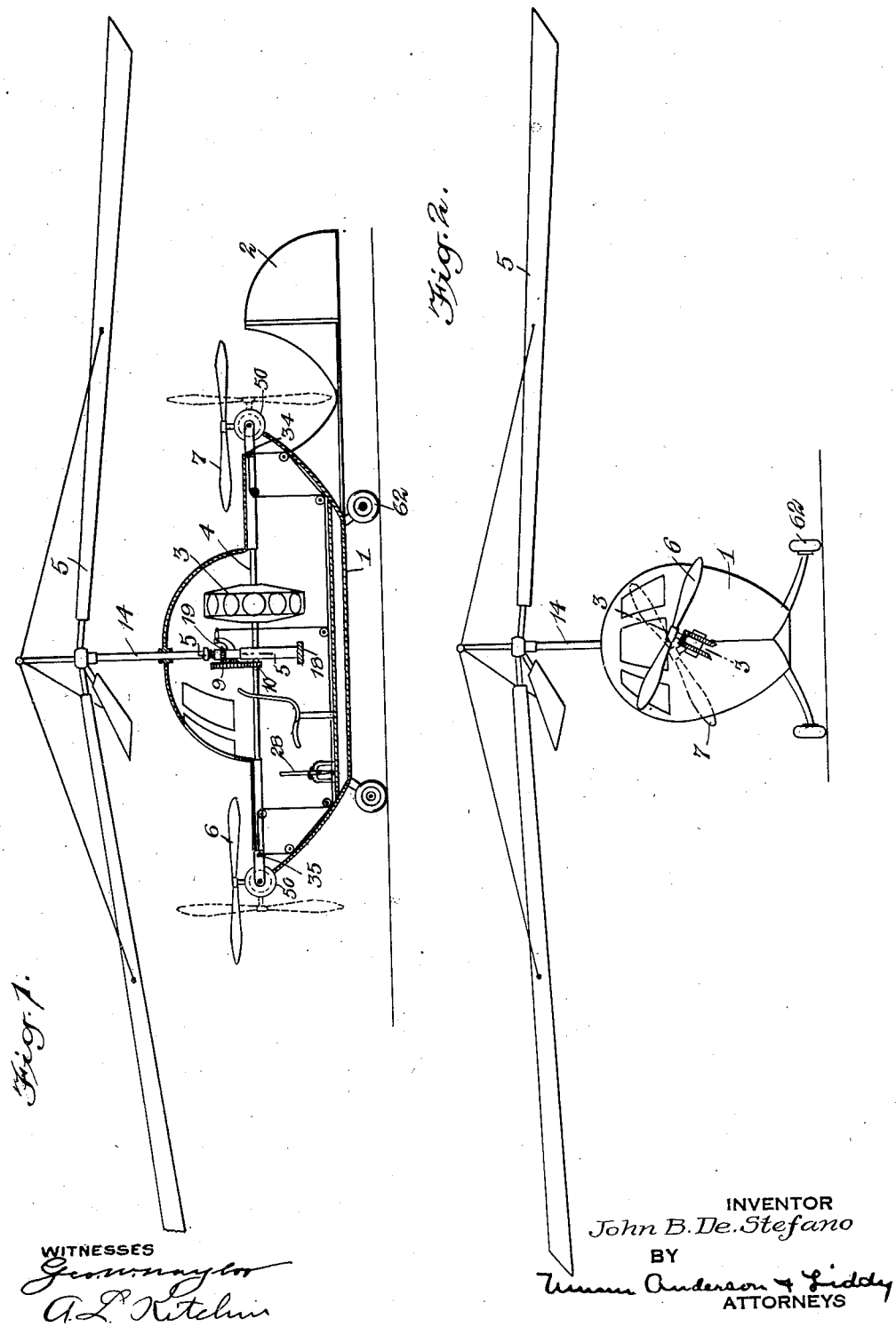
INVENTOR
John B. De Stefano
BY
Anderson & Liddy
ATTORNEYS Sept. 20, 1938.   J. B. DE STEFANO   2,130,918
HELICOPTER
Filed Oct. 9, 1937   4 Sheets-Sheet 2
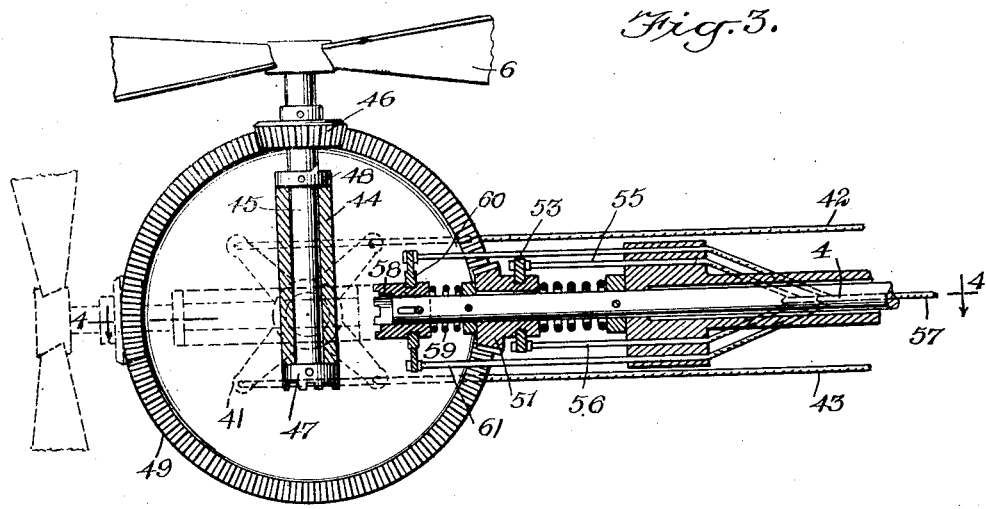
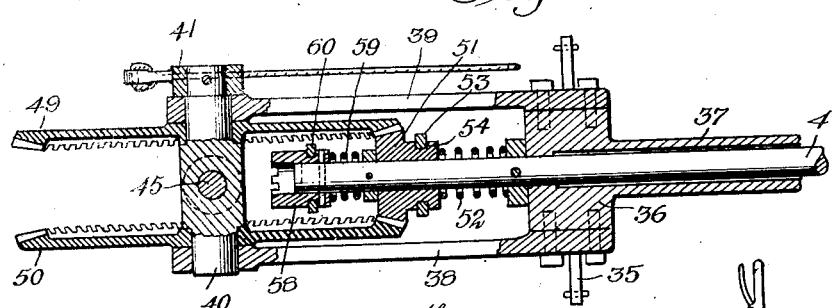
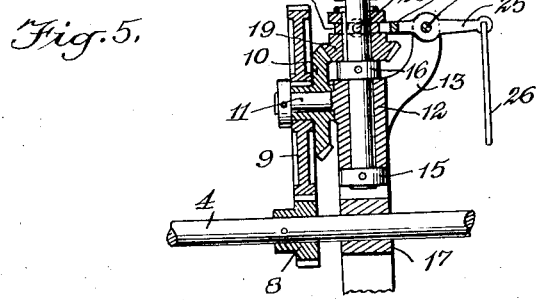
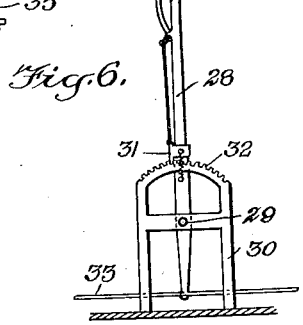
WITNESSES
INVENTOR
John B. De. Stefano
BY
ATTORNEYS Sept. 20, 1938.  J. B. DE STEFANO  2,130,918
HELICOPTER
Filed Oct. 9, 1937  4 Sheets-Sheet 3
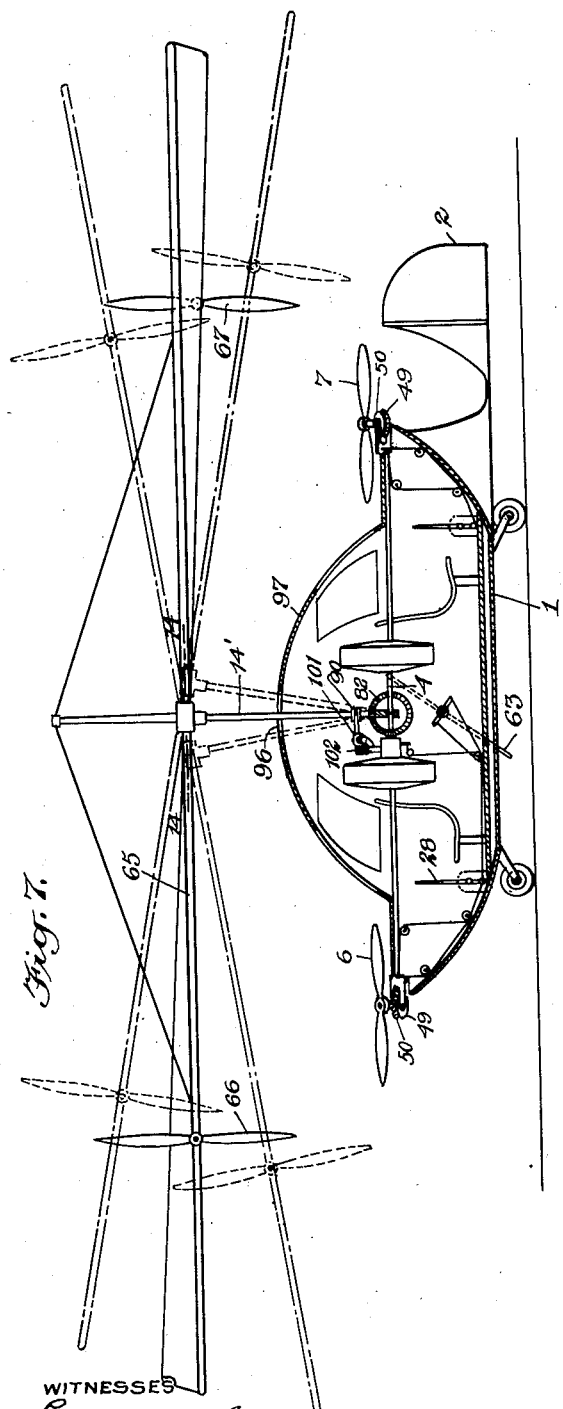
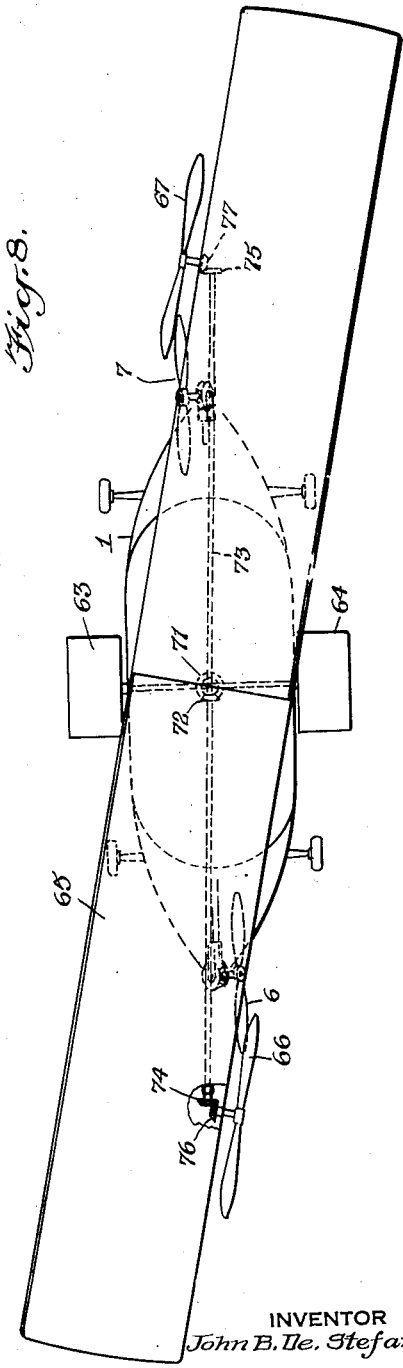
INVENTOR
John B. De Stefano
BY
Munn Anderson & Liddy
ATTORNEYS Sept. 20, 1938.    J. B. DE STEFANO    2,130,918
HELICOPTER
Filed Oct. 9, 1937    4 Sheets-Sheet 4
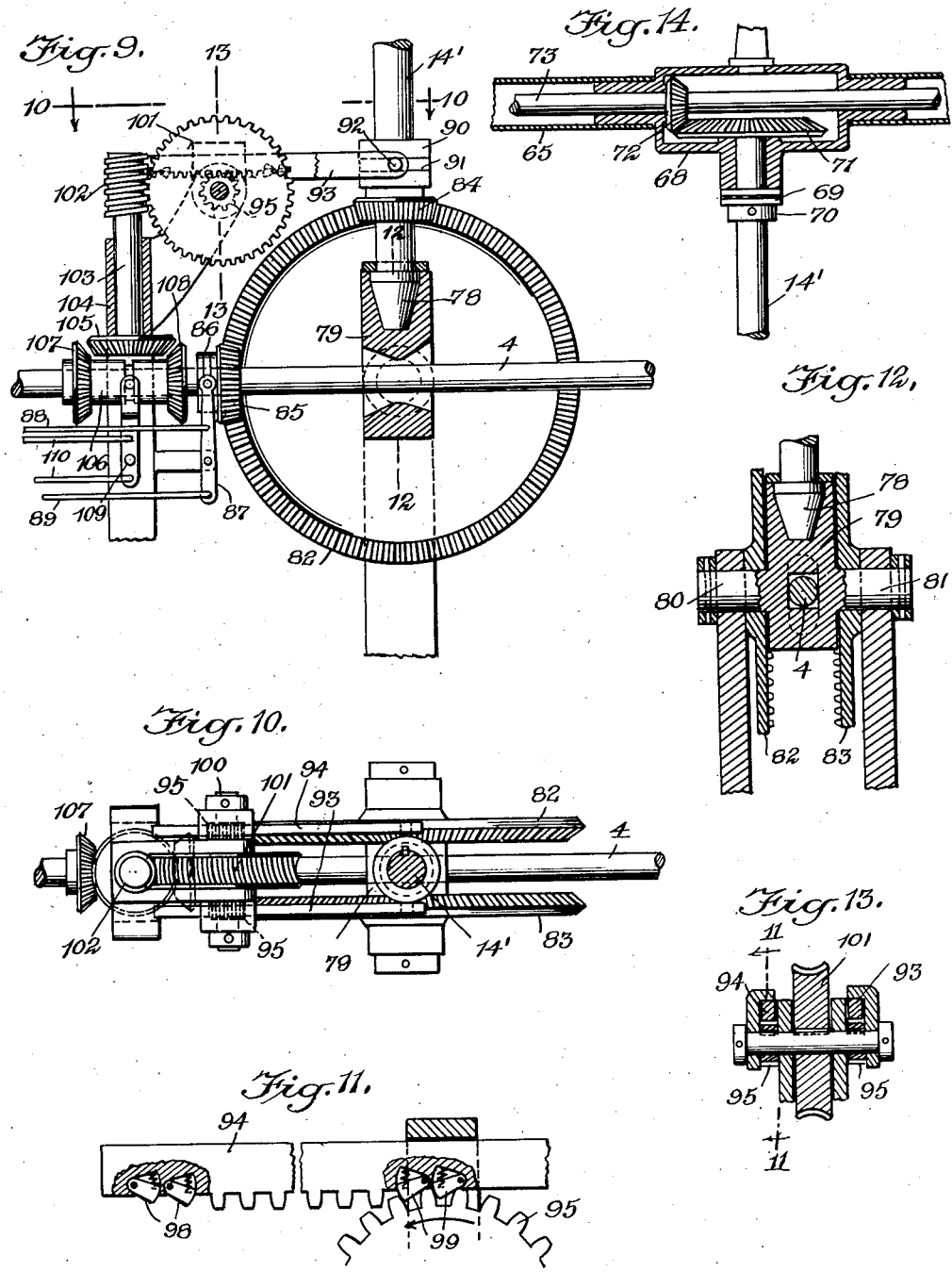
WITNESSES
Geo. W. Naylor
A. L. Kitchin
INVENTOR
John B. De Stefano
BY
Anderson & Liddy
ATTORNEY Patented Sept. 20, 1938

2,130,918

UNITED STATES PATENT OFFICE 2,130,918

HELICOPTER

John B. De Stefano, New York, N. Y.

Application October 9, 1937, Serial No. 168,190

6 Claims. (Cl. 244—17)

This invention relates to airships and particularly to an improved helicopter, an object being to provide a construction which is simple and effective to quickly move directly upwardly into the air and then horizontally with the minimum amount of effort.

Another object of the invention is to provide a helicopter in which supported propellers may be shifted to different angles as the airship moves through the air.

A further object more specifically is to provide in a helicopter adjustable propellers arranged in the front and in the rear of the gondolier for at one time counteracting the rotating torsion of the lifting blades or propellers and at another time as means for assisting in raising or propelling the airship through the air.

In the accompanying drawings—

Figure 1 is a side view partly in section disclosing an embodiment of the invention;

Figure 2 is a front view of the helicopter shown in Figure 1;

Figure 3 is an enlarged fragmentary sectional view through Figure 2 approximately on the line 3—3;

Figure 4 is a horizontal sectional view through Figure 3 on the line 4—4;

Figure 5 is a fragmentary sectional view through Figure 1 approximately on the line 5—5, illustrating the driving mechanism for the lifting propeller or blades;

Figure 6 is a side view of a controlling lever used in adjusting certain parts of the device;

Figure 7 is a view similar to Figure 1 but showing a slightly modified construction;

Figure 8 is a top plan of the helicopter shown in Figure 7;

Figure 9 is a view similar to the central part of Figure 7 but showing the parts enlarged;

Figure 10 is a sectional view through Figure 9 approximately on the line 10—10;

Figure 11 is a fragmentary sectional view through Figure 13 on the line 11—11;

Figure 12 is a fragmentary view through Figure 9 on the line 12—12;

Figure 13 is a fragmentary sectional view through Figure 9 on the line 13—13; and Figure 14 is an enlarged fragmentary sectional view through Figure 7 approximately on the line 14—14.

Referring to the drawings by numerals, 1 indicates a gondola which may be of any desired size and construction. The gondola is provided with a rotor 2 which is adapted to be actuated by suitable mechanism (not shown). As illustrated in Figure 1, the car or gondola 1 carries a motor or prime mover 3 which may be an internal combustion engine or any suitable engine mounted in any suitable way so as to rotate the main drive shaft 4. As hereinafter fully described, power is taken off the shaft 4 for rotating the elevating propeller or wings 5 and also the propellers 6 and 7. As shown in Figure 5, a pinion 8 is keyed, riveted or otherwise rigidly secured to the shaft 4 and, consequently, continually rotates when the engine 3 is functioning. The pinion 8 continually meshes with a pinion 9 to which is secured a bevel gear 10. Gears 9 and 10 are rotatably mounted on a stub shaft 11 carried by a sleeve 12 formed with a bracket 13. A lifting propeller shaft 14 is rotatably mounted in the sleeve 12 formed with a bracket 13. A lifting propeller shaft 14 is rotatably mounted in the sleeve 12 and is held against longitudinal movement by abutments 15 and 16 which are riveted or otherwise rigidly secured to the shaft, there being one abutment adjacent each end of the sleeve 12. This sleeve is integral with an extension 17 which has a bore through which shaft 4 extends and which rests on a suitable support 18 (Figure 1). This support 18 is rigidly secured in any desired manner to the gondola 1. A bevel pinion 19 is splined on shaft 14 and is normally held in position to mesh with gear 10 by a spring 20 acting against the pinion and against an abutment or stop 21. By this construction the shaft 14 is rotated at the same time that the shaft 4 rotates, but at a slower speed because the train of gears just mentioned produces a reduction. The hub of the pinion 19 is provided with a groove 22 adapted to receive the respective pins 23 of a yoke 24 forming part of the lever 25. A cable 26 is connected with the outer end of lever 25, which lever is pivotally mounted on a pivot 27 on the bracket 13. The cable 26 is adapted to be connected with the moving parts of a shift lever 28 which is shown in detail in Figure 6. This shift lever is pivotally mounted at 29 on a suitable support 30 and is locked in any desired position by a sliding catch 31 extending between certain of the teeth of a rack 32. As illustrated in the drawings, the lower end of lever 28 is connected with a cable 33, which cable is connected to the respective pins 34 and 35 shown in Figures 1 and 4. When the lever 28 is moved in one direction the guiding head 36 (Figure 4) and the sleeve 37 rotate together with the arms 38 and 39 which carry certain gear mechanism hereinafter fully described.

When the lever 28 is pulled to a certain position the arms 38 and 39 are moved until the parts appear as shown in Figure 2. These parts, together with the propeller 6, could be tilted to a greater extent or to a less extent as may be desired. The propeller 7 and associated parts are tilted in the opposite direction. These two propellers act in several capacities but when the machine is rising in the air and the lifting propeller 5 is functioning, the respective propellers 6 and 7 are caused to function to prevent the gondola 1 from rotating with the lifting propeller 5. When ascending there is considerable torque tending to rotate the gondola with the lifting propeller 5. Consequently, the propellers 6 and 7 must function to prevent any rotation of the gondola. After the desired elevation has been secured, the propellers 6 and 7 may be shifted gradually to other positions and eventually to the position shown in dotted lines in Figure 5 when the airship is moving forwardly at a comparatively high rate of speed.

The propellers 6 and 7 may be rotated in one plane similar to the position shown in Figure 2 or other similar position, and may be rotated in a plane at right angles thereto around an axle 40 as shown in Figure 4. This axle is rotatably mounted in the arms 38 and 39 and has an actuating arm 41 which extends on opposite sides of the axle and to which the respective cables 42 and 43 are secured. These cables extend over suitable guiding pulleys to a lever similar to lever 28, whereby the aviator may readily shift axle 40 and parts carried thereby. It will be observed that the axle 40 is integral with or rigidly secured to a sleeve 44 through which extends a rotating shaft 45. This shaft 45 has a bevel pinion 46 rigidly secured thereto and also to the propeller 6. A clutch head 47 is secured to shaft 45 and coacts with an abutment 48 riveted or otherwise secured to shaft 45 so as to hold this shaft against longitudinal movement without interfering with the rotary movement of axle 40. The pinion 46 continually meshes with large bevel gears 49 and 50 so as to be driven by the gears when necessary. It will be observed from Figures 3 and 4 that a driving pinion 51 may be brought into mesh with the large bevel gears 49 and 50 and when this is done and the power shaft 4 to which it is secured is rotated, the gears 49 and 50 will be rotated in unison but in opposite directions and will cause the pinion 46 and propeller 6 to be rotated. This action will also hold pinion 46 in any of its adjusted positions.

From Figure 4 it will be seen that a spring 52 acts to hold bevel gear 41 in mesh. However, a ring 53 is provided and this ring fits into a suitable groove 54 in the hub of pinion 51. Ring 53 does not rotate but slides in the groove 54 while pinion 51 is rotating. A yoke formed by cables 55 and 56 is secured to the ring 53 and connected with a cable 57 which in turn is connected to a lever similar to lever 28 whereby pinion 51 may be pulled until it is out of mesh with the gears 49 and 50. This pinion is pulled out of mesh so as to free the gear wheels 49 and 50 when it is desired to shift the position of pin 46 and propeller 6. Also it is shifted out of mesh when the clutch member 47 is to be brought into engagement with the clutch member 58. The clutch member 58 is similar to the pinion 51 and is splined to shaft 4 so that it may slide along this shaft against the action of a spring 59 when the ring 60 is pulled by a yoke 61, which yoke is connected to a cable similar to cable 57 and also to a lever similar to lever 28. When it is desired to have the propeller directly in front of the shaft 4, both the pinion 51 and clutch 58 are pulled to the right as shown in Figure 3, and then cable 43 is pulled until the parts are in the dotted position shown in Figure 3, whereupon the clutch 58 is released and the spring 59 will function to cause the clutch 58 to move into mesh with clutch 47, whereby the propeller 6 is directly connected with the power drive shaft 4. When this is taking place, the pinion 51 is held out of mesh so that the large bevel gears 49 and 50 will merely rotate in an idle manner.

By the construction just described it will be observed that the respective propellers 6 and 7 may be moved to various positions so that these propellers may act as lifting propellers, steadying propellers, or propellers for urging the airship forwardly. By adjusting the propellers 6 and 7 the airship may be pointed slightly upwardly or downwardly according to the desire of the aviator. Whenever it is desired to land, the bevel pinion 19 shown in Figure 5 is moved out of mesh with the bevel gear 10, whereupon the lifting propeller 5 is freed from the engines and acts in a certain sense as a parachute to partially support the airship. Also when the device is moving over the ground on its supporting rollers 62, the lifting propeller 5 may be disconnected as just described and the propellers 6 and 7 moved to the dotted position shown in Figure 1. This will result in the device moving over the surface of the ground to any desired location.

In Figures 7 to 14, inclusive, there will be seen a slightly modified construction to that illustrated in Figure 1. Where the parts are identical the same reference numerals will be used, but where the parts are different they will be indicated by different reference numerals. As shown particularly in Figures 7 and 8, the propellers 6 and 7 function in a similar way to the preferred form and are of identically the same construction. However, there is provided a pair of balancing planes or wings 63 and 64 which may be shifted by a suitable lever similar to lever 28 to balance the airship as it moves through the air.

Instead of having several blades as in the propeller 5, there is provided a single double wing 65 which is much longer. This wing or propeller is rotated similar to the propeller 5 to produce a lifting action. However, instead of power being transmitted through the upright shaft 14' it is transmitted through suitable rods or gearing to the respective propellers 66 and 67. The shaft 14' is not rigidly secured to the propeller 65 but acts as a support therefor as shown particularly in Figure 14. From this figure it will be seen that the propeller 65 has a central housing 68 which is supported by suitable bolt bearings 69 carried by a stop 70 which is rigidly secured to shaft 14'. Shaft 14' is rigidly connected with a bevel gear 71 which continually meshes with a bevel pinion 72 rigidly secured to a shaft 73. Shaft 73, as indicated in Fig. 8, extends diagonally through the propeller 65 and is rigidly secured to the respective bevel gears 74 and 75 which are continually meshing with bevel gears 76 and 77. The last mentioned bevel gears are rigidly connected with the propellers 66 and 67 whereby whenever shaft 14' is rotating, propellers 66 and 67 will be rotating so as to move the large propeller 65 and cause the same to function to produce a lifting action.

The propeller 65 is adapted to be tilted as shown in dotted lines in Figure 7. This tilting is caused by a swing of shaft 14' forwardly or rearwardly. As indicated in Figures 9 and 12, the lower end of shaft 14' is provided with an enlargement 78 which is fitted into the block 79. This block is preferably formed with integral journal members 80 and 81. It will also be noted that the shaft 14' extends between the driving pinions 82 and 83 and carries a bevel pinion 84 which is rigidly secured to the shaft and which continually meshes with gear wheels 82 and 83 whereby whenever these gear wheels are rotated shaft 14' will be rotated. A second bevel gear 85 is splined to the power shaft 4 so that when the parts are in the position shown in Figure 9 and shaft 6 is rotated, power will be transmitted to shaft 14' to rotate the same. The hub of pinion 85 is provided with a groove adapted to receive a slit ring 86 connected with a lever 87 whereby whenever the respective cables 88 and 89 are actuated the pinion 85 will be moved into or out of clutch with the gear wheels 82 and 83.

As shown in Figure 9, a sleeve 90 is rigidly secured to the shaft 14' and is provided with a groove accommodating the guard ring 91 which is connected through pins 92 to the respective arms 93 of the respective racks 94. Each of these racks coacts with a gear wheel 95, as shown in Figure 11, whereby the arms 93 may be moved back and forth and the shaft 14' swung back and forth within the limits of the slot 96 (Figure 7) of the frame 97.

From Figure 11 it will be noted that the special racks 94 are provided with special gear teeth 98 and 99 which are spring pressed and function in opposite directions. When the rack 94 has been moved to its extreme position in one direction as shown in Figure 11, a continued rotation of gear wheel 95 will not move the rack to any great extent. However, whenever the gear wheel 95 has been reversed in its direction the teeth thereof will immediately engage the special teeth 99 and quickly shift the rack to the right as shown in Figure 11. This shifting movement will continue until the gear wheel strikes the special teeth 98 whereupon the movement of the rack will cease. The respective gear wheels 95 are connected by a suitable shaft 100 to a worm wheel 101 which continually meshes with a worm 102. The worm 102 is rigidly secured to a shaft 103 carried by a suitable journal 104 and rigidly secured to a bevel gear 105.

Surrounding the shaft 4, as shown in Figure 9, is a sleeve 106 which is splined to the shaft and to which is secured the respective bevel gears 107 and 108. A lever 109 is operated through cables 110 to shift the sleeve and bevel gears back and forth so that when bevel gear 108 is meshing with bevel gear 105 the parts are moving in one direction, and when bevel gear 107 is meshing with bevel gear 105 the parts are moving in the opposite direction. When neither bevel gear is meshing with gear 105, the worm and worm wheel act to lock the shaft 14' against swinging movement. Normally when the airship is in use, the shaft 14' is vertical but it may be tilted as just described when special circumstances demand this action, as, for instance, when there is a peculiar wind which must be taken into consideration.

It will be noted that the construction shown particularly in Figures 3 and 4 is such that the propeller 6 may function to drive the airship forwardly or to drive the ship rearwardly. The shaft 4 is always rotating in one direction and power is transmitted from this shaft through pinion 51 to gear wheels 49 and 50 so as to rotate pinion 48 and propeller 6. If propeller 6 should be moved around to the dotted position shown in Figure 3 and the clutch member 49 retracted, the propeller would drive the airship in one direction, but if the clutch 58 were allowed to engage clutch 47 and pinion 51 were moved out of gear, propeller 6 would rotate so as to drive the shaft in the opposite direction. By manipulating the parts the propeller 6 may be caused to rotate in either of two directions and this, of course, is true of propeller 7 and associated parts which are identical with propeller 6 and associated parts.

I claim:

1. A helicopter including a body or gondola, a lifting propeller having a greater span than the length of the gondola, a shaft connected with the center of said propeller for actuating said propeller, hand controlled power actuated means for tilting the propeller in a vertical plane, a power element connected with said shaft for rotating the shaft, a comparatively small propeller at each end of the gondola, means for connecting the last-mentioned propellers with the power element so that they will be rotated, and manually actuated means for shifting the angle at which the last-mentioned propellers function to produce a lifting action, a forward and reversible movement of the helicopter and at the same time function so as to cause the gondola to resist any turning action produced by the lifting propeller.

2. A helicopter including a gondola, a propeller arranged at each end of the gondola, means for shifting the angle at which said propellers are functioning so that they may function to produce a lifting action, a forward movement of the gondola, a rearward movement of the gondola, and also a retarding action to the tendency of the gondola to spin, a lifting propeller having a span greater than the length of the gondola arranged substantially centrally of the gondola but spaced above the same, a driving shaft connected with the center of said lifting propeller, a prime mover, a longitudinally extending shaft constantly rotated by said prime mover, and independently actuated hand-controlled means for connecting and disconnecting said shaft with all of the propellers to cause the same to function as determined by the operator.

3. In a helicopter, a lifting propeller, a prime mover for causing the lifting propeller to function, a gondola, a propeller at each end of said gondola, and means for connecting the last-mentioned propellers with the prime mover, each of said means including a pair of large bevel gears, a small bevel gear continually meshing with the large bevel gears, a shaft carrying the propeller and the small bevel gear, a rotatable bearing for said shaft, said bearing having journal members extending through the center of said bevel gears, manually actuated means for rotating said bearing and means for disconnecting the power from said bevel gears when said bearing is being rotated.

4. In a helicopter of the character described, a propeller arranged at one end of the helicopter, a shaft carrying said propeller, a bevel gear rigidly secured to said shaft, a journal member for said shaft, said journal member having a pair of auxiliary journals arranged at right angles thereto, a pair of facing bevel gears rotatably mounted on said auxiliary journals and continually meshing with the first-mentioned bevel gear, a driving shaft, a clutch member carried by the first-mentioned shaft, a clutch member carried by said driving shaft and actuated thereby, manually actuated means for causing said clutch members to interlock so that said driving shaft will be connected directly with the first-mentioned shaft for rotating said propeller, and manually actuated means for connecting said driving shaft to said propeller through said bevel gears.

5. In a helicopter of the character described, a gondola, a power element arranged in the gondola, a double-wing lifting propeller, a shaft supporting said propeller centrally thereof, said shaft being operatively connected with said power element so as to be rotated thereby, manually controlled power-actuated means for swinging said shaft forwardly and rearwardly to tilt said lifting propeller without interfering with the rotation thereof, said power-actuated means including a rack having one end rotatably surrounding said shaft, a gear positioned to mesh with said rack, means for disengageably connecting said gear with said power element, and means carried by said rack for preventing automatically said gear moving the shaft too far, auxiliary propellers set inwardly from the respective ends of said lifting propeller, and means connecting said auxiliary propellers with said shaft so as to be rotated thereby and to said lifting propeller to rotate around said shaft.

6. In a helicopter, a gondola, a lifting propeller having a greater span than the length of the gondola, a shaft connecting said propeller and gondola whereby the gondola is supported by the propeller, said propeller being rotatable independently of the shaft, an auxiliary propeller adjacent each end of the lifting propeller, said auxiliary propellers being positioned at the leading and trailing edges of the lifting propeller, means for connecting said shaft with said auxiliary propellers so that when said shaft is rotated said auxiliary propellers will be rotated and will as a result rotate said lifting propeller, a prime mover carried by said gondola, a shaft driven by said prime mover, means for connecting said first-mentioned shaft with said last-mentioned shaft so as to transmit power to said auxiliary propellers, and hand-controlled means actuated by power from said second-mentioned shaft for swinging the first-mentioned shaft in order to tilt said lifting propeller, said last-mentioned means including a rack having one end rotatably surrounding said first-mentioned shaft, a gear wheel meshing with said rack, means including hand-controlled clutches for connecting and disconnecting said gear wheel with the second-mentioned shaft, and a group of pivotally mounted teeth on said rack at the respective ends of the travel of said gear wheel, said teeth permitting the gear wheel to move the rack to its extreme position and then presenting means for permitting the gear wheel to turn back to an intermediate or to an opposite extreme position.

JOHN B. DE STEFANO.